(12) United States Patent
Wu et al.

(10) Patent No.: US 10,952,108 B2
(45) Date of Patent: Mar. 16, 2021

(54) DEVICE AND METHOD OF HANDLING A SYSTEM REDIRECTION PROCEDURE

(71) Applicant: HTC Corporation, Taoyuan (TW)

(72) Inventors: Chih-Hsiang Wu, Taoyuan (TW); Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/214,139

(22) Filed: Dec. 10, 2018

(65) Prior Publication Data

US 2019/0182726 A1 Jun. 13, 2019

Related U.S. Application Data

(60) Provisional application No. 62/597,400, filed on Dec. 11, 2017.

(51) Int. Cl.
| | |
|---|---|
| *H04W 36/00* | (2009.01) |
| *H04W 36/14* | (2009.01) |
| *H04W 36/22* | (2009.01) |
| *H04W 88/06* | (2009.01) |
| *H04W 76/27* | (2018.01) |

(52) U.S. Cl.
CPC ... *H04W 36/0066* (2013.01); *H04W 36/0022* (2013.01); *H04W 36/0061* (2013.01); *H04W 36/14* (2013.01); *H04W 36/22* (2013.01); *H04W 76/27* (2018.02); *H04W 88/06* (2013.01)

(58) Field of Classification Search
None
See application file for complete search history.

(56) References Cited

U.S. PATENT DOCUMENTS

| 2013/0183981 A1 | 7/2013 | Singh | |
|---|---|---|---|
| 2013/0260745 A1* | 10/2013 | Johansson | H04W 36/14 455/423 |

(Continued)

FOREIGN PATENT DOCUMENTS

| CN | 102892144 A | 1/2013 |
|---|---|---|
| CN | 104137608 A | 11/2014 |

(Continued)

OTHER PUBLICATIONS

3GPP TS 23.501 V1.5.0, Nov. 2017.

(Continued)

*Primary Examiner* — San Htun
(74) *Attorney, Agent, or Firm* — Winston Hsu

(57) ABSTRACT

A communication device for handling a redirection comprises at least one storage device storing instructions of receiving a redirection message from a first base station (BS) of the first radio access technology (RAT) via a first cell, wherein the redirection message comprises RAT information indicating a second RAT and indicates a first core network (CN); entering an idle state in response to the redirection message; selecting a second cell of the second RAT according to the RAT information; establishing a radio resource control (RRC) connection via the second cell to a second BS in the idle state; generating a non-access-stratum (NAS) message for the first CN according to the redirection message; and transmitting the NAS message on the RRC connection via the second cell to the second BS.

8 Claims, 5 Drawing Sheets

(56) References Cited

U.S. PATENT DOCUMENTS

| | | | | |
|---|---|---|---|---|
| 2013/0303176 | A1* | 11/2013 | Martin | H04W 76/18 |
| | | | | 455/450 |
| 2014/0051443 | A1 | 2/2014 | Diachina | |
| 2014/0169330 | A1* | 6/2014 | Rommer | H04W 36/08 |
| | | | | 370/331 |
| 2016/0057668 | A1* | 2/2016 | Lee | H04W 48/20 |
| 2017/0318452 | A1* | 11/2017 | Hahn | H04W 8/20 |
| 2018/0063774 | A1* | 3/2018 | Gupta | H04W 48/18 |
| 2018/0343635 | A1* | 11/2018 | Edge | G01S 5/0236 |

FOREIGN PATENT DOCUMENTS

| | | |
|---|---|---|
| CN | 106332222 A | 1/2017 |
| CN | 111357326 A | 6/2020 |
| WO | 2019/097302 A1 | 5/2019 |

OTHER PUBLICATIONS

3GPP TS 23.502 V1.3.0, Nov. 2017.
3GPP TS 38.300 V1.2.0, Nov. 2017.
3GPP TSG-RAN2 Meeting #103, R2-1813400, Aug. 2018.
3GPP TSG-RAN WG2 AH 1807, R2-1813332, Aug. 2018.
Nokia, Nokia Shanghai Bell, Intel, AT&T, Charter Communications, T-Mobile USA, Verizon, Motorola Mobility, Lenovo, LG Electronics, FirstNet, Ericsson, "23.501: OI2a: Emergency Services Fall back", SA WG2 Meeting #124, S2-179474, Nov. 27-Dec. 1, 2017, Reno, Nevada, USA, XP051380078, pp. 1-4.
Search Report dated May 2, 2019 for EP application No. 18211712.7, pp. 1-6.
T-Mobile USA INC, "Smooth UE IRAT redirection", SA WG2 Meeting #122bis, S2-175765, Aug. 21-25, 2017, Sophia Antipolis, France, pp. 1-9.
3GPP, Technical Specification 3rd Generation Partnership Project;Technical Specification Group Radio Access Network; NR; NR and NG-RAN Overall Description; Stage 2 (Release 15), 3GPP TS 38.300 V1.3.0 (Dec. 2017) (Dec. 8, 2017), pp. 1-68.
Office action dated Oct. 3, 2019 for the Taiwan application No. 107144911, filing date Dec. 10, 2018, p. 1-12.
Office action dated Jul. 31, 2020 for EP application No. 18211712.7, pp. 1-12.
Ericsson, "TS 23.501:EPS Fallback for voice", SA WG2 Meeting #124, S2-178544, Nov. 27-Dec. 1, 2017, Reno, USA, XP051379556, pp. 1-4.
Ericsson, "TS 23.502:EPS Fallback for voice", SA WG2 Meeting #124, S2-178545, Nov. 27-Dec. 1, 2017, Reno, USA, XP051379557, pp. 1-5.
Nokia et al., "23.501: OI2a: Emergency Services Fall back", SA WG2 Meeting #124, S2-179474, Nov. 27-Dec. 1, 2017, Reno, Nevada, USA, XP051380078, pp. 1-4.
NTT DOCOMO, P-CR on Solution 1:Redirection Solution, SA WG2 Meeting #103, May 19-23, 2014, Phoenix, Arizona, USA, S2-141710 (revision of S2-14xxxx), pp. 1-8.
Office action dated Nov. 30, 2020 for the China application No. 201811503476.1, filing date Dec. 10, 2018, pp. 1-14.

* cited by examiner

DEVICE AND METHOD OF HANDLING A SYSTEM REDIRECTION PROCEDURE

CROSS REFERENCE TO RELATED APPLICATIONS

This application claims the benefit of U.S. Provisional Application No. 62/597,400, filed on Dec. 11, 2017, which is incorporated herein by reference.

BACKGROUND OF THE INVENTION

1. Field of the Invention

The present invention relates to a device and a method used in a wireless communication system, and more particularly, to a device and a method of handling a system redirection procedure.

2. Description of the Prior Art

A new radio (NR) system, recently developed by the 3rd generation partnership project (3GPP), is regarded as a NR interface and radio network architecture that provides a high data rate, a low latency, a packet optimization, and an improved system capacity and coverage.

SUMMARY OF THE INVENTION

The present invention therefore provides a communication device and method for handling a system redirection procedure to solve the abovementioned problem.

A communication device for handling a redirection comprises at least one storage device and at least one processing circuit coupled to the at least one storage device. The at least one storage device stores, and the at least one processing circuit is configured to execute instructions of receiving a redirection message from a first base station (BS) of a first radio access technology (RAT) via a first cell, wherein the redirection message comprises RAT information indicating the second RAT and indicates a first core network (CN); entering an idle state in response to the redirection message; selecting a second cell of the second RAT according to the RAT information; establishing a radio resource control (RRC) connection via the second cell to a second BS in the idle state; generating a non-access-stratum (NAS) message for the first CN according to the redirection message; and transmitting the NAS message on the RRC connection via the second cell to the second BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
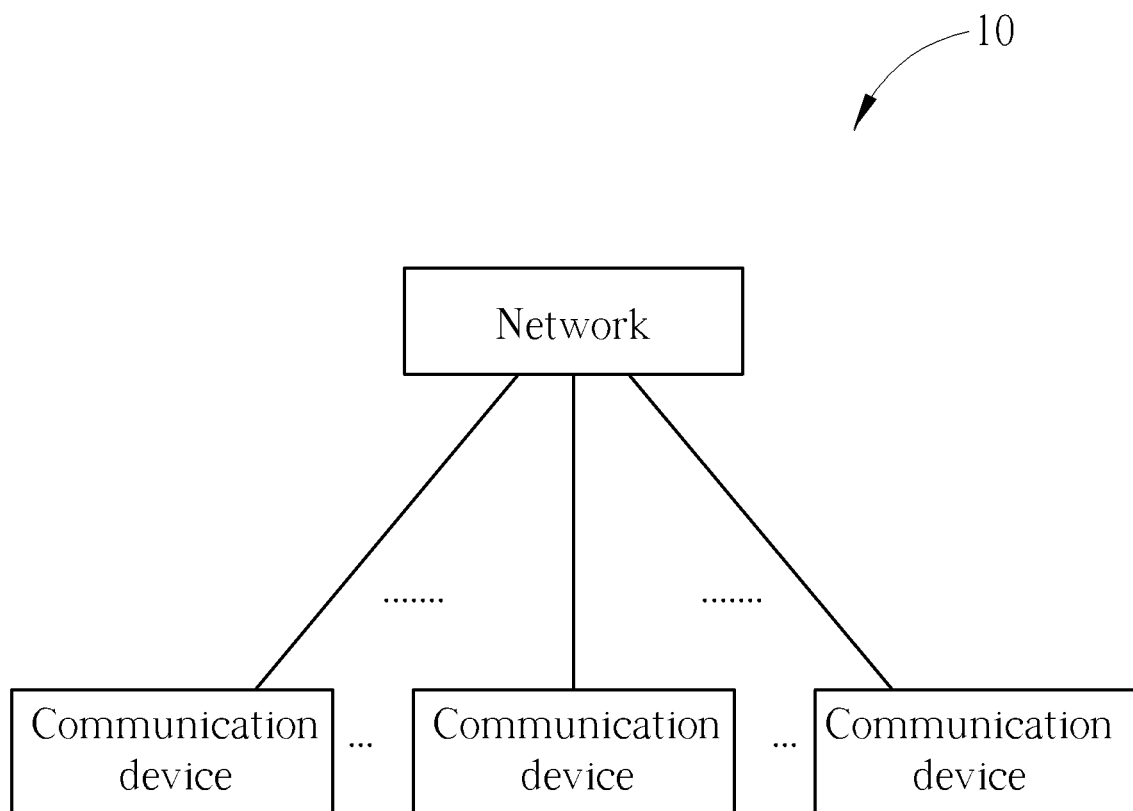
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., one or multiple carriers) belonging to one or multiple base stations (BSs). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network includes an evolved universal terrestrial radio access network (E-UTRAN) including at least one evolved Node-B (eNB) and/or a fifth generation (5G) network including at least one 5G BS (e.g., gNB and/or next generation eNB (ng-eNB)) which employs orthogonal frequency-division multiplexing (OFDM) and/or non-OFDM and a transmission time interval (TTI) shorter than 1 ms (e.g., 1, 2, 3 or 4 OFDM symbols, 100 or 200 microseconds), to communicate with the communication devices. In general, a BS may also be used to refer any of the NB, the eNB and the 5G BS.

Furthermore, the network may also include both a radio access network (RAN) (e.g., the E-UTRAN/5G-RAN) and a core network (CN), wherein the CN includes network entities such as Mobility Management Entity (MME), Serving Gateway (S-GW), Packet Data Network (PDN) Gateway (P-GW) and/or 5G Access and Mobility Management Function (AMF), etc. In other words, after the network receives information transmitted by a communication device, the information may be processed only by the RAN and decisions corresponding to the information are made at the RAN. Alternatively, the RAN may forward the information to the CN, and the decisions corresponding to the information are made at the CN after the CN processes the information. Besides, the information can be processed by both the RAN and the CN, and the decisions are made after coordination and/or cooperation are performed by the RAN and the CN.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
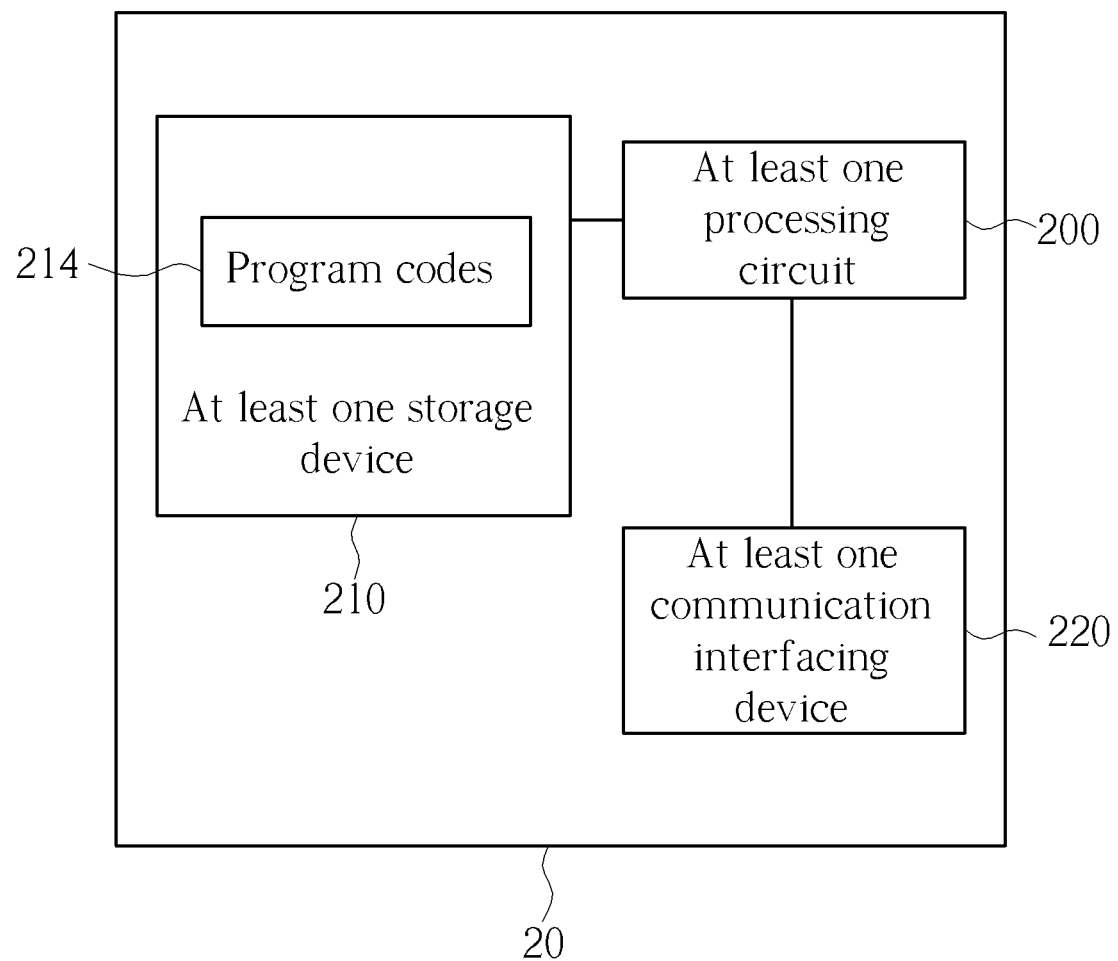
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing a communication device in FIG. 1, to simplify the illustration of the embodiments.

A UE connected to a fifth generation core (5GC) network through a cell of a BS (e.g., eNB or gNB) may receive a redirection message (e.g., a RRC Connection Release message) from the BS, wherein the redirection message may order the UE to select a second cell of an eNB. The eNB may connect to at least one CN, e.g., an Evolved Packet Core (EPC) network and/or the 5GC network. However, the BS cannot control the UE to select the EPC network or the 5GC network. In addition, it is not clear how the UE selects and connects to the EPC network or the 5GC network in response to the redirection message.

Figure 3:
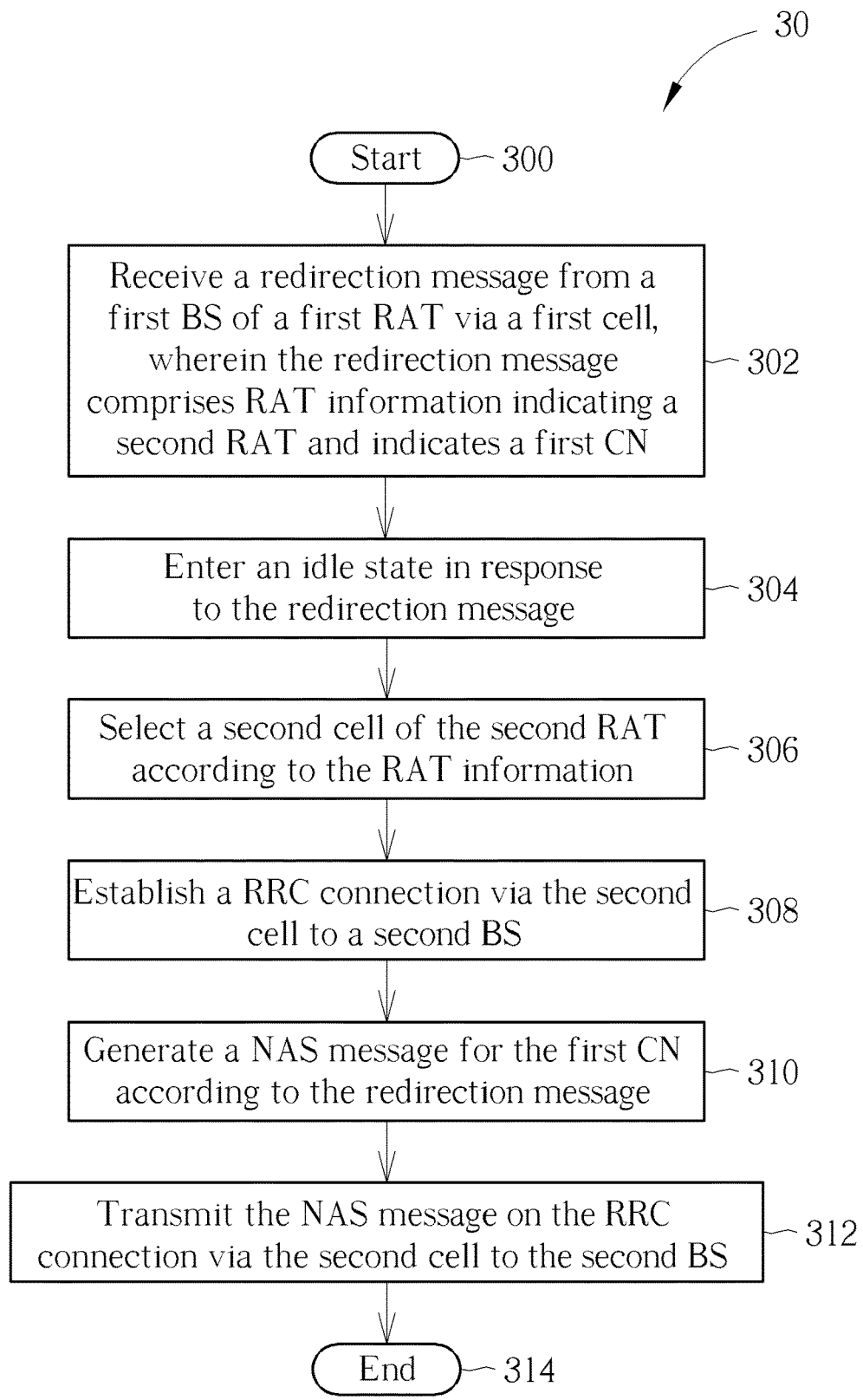
FIG. 3 is a flowchart of a process according to an example of the present invention.

A process 30 in FIG. 3 is utilized in a UE to handle a redirection, and includes the following steps:

Step 300: Start.

Step 302: Receive a redirection message from a first BS of a first radio access technology (RAT) via a first cell, wherein the redirection message comprises RAT information indicating a second RAT and indicates a first CN.

Step 304: Enter an idle state in response to the redirection message.

Step 306: Select a second cell of the second RAT according to the RAT information.

Step 308: Establish a radio resource control (RRC) connection via the second cell to a second BS.

Step 310: Generate a non-access-stratum (NAS) message for the first CN according to the redirection message.

Step 312: Transmit the NAS message on the RRC connection via the second cell to the second BS.

Step 314: End.

In one example, the second BS transmits the NAS message to the first CN. That is, the UE transmits the NAS message to the first CN via the second BS. In one example, the NAS message is a Registration Request message, if the redirection message indicates the first CN. In one example, the UE generates a NAS message for a second CN, if the redirection message (or the RAT information) indicates the second RAT and the second CN instead of the first CN. In this case, the NAS message is a Tracking Area Update Request message or an Attach Request message In one example, the NAS message is a 5G system (5GS) message, when the redirection message indicates an Evolved Universal Terrestrial Radio Access (E-UTRA) (i.e., the second RAT) and a 5GC network (i.e., the first CN). In one example, the NAS message is an Evolved Packet System (EPS) message, when the redirection message indicates the E-UTRA (i.e., the second RAT) and an EPC network (i.e., the second CN).

In one example, the redirection message indicates the first CN by including first CN information indicating the first CN. In one example, the redirection message indicates the second CN by including second CN information indicating the second CN. In one example, the redirection message indicates the first CN by not including the second CN information. In one example, the redirection message indicates the second CN by not including the first CN information.

In one example, the redirection message includes RAT information indicating a RAT (e.g., the first RAT or the second RAT) and includes CN information indicating a CN (e.g., the first CN or the second CN). The UE selects the first CN or the second CN according to the CN information (e.g., the first CN information and/or the second CN information). The UE in the idle state transmits a RRC Connection Request message via the second cell to the second BS to establish the RRC connection according to the second RAT, if the RAT information indicates the second RAT. The UE receives a RRC Connection Setup message responding to the RRC Connection Request message from the second BS via the second cell, and considers that the RRC connection is established (i.e., the UE enters a connected state from the idle state). The UE transmits a RRC Connection Setup Complete message responding to the RRC Connection Setup message to the second BS via the second cell. In one example, the UE indicates that the first CN or the second CN is selected in the RRC Connection Request message or in the RRC Connection Setup Complete message.

In one example, the UE may include CN information indicating the first CN in the RRC Connection Request message or in the RRC Connection Setup Complete message. The UE may include CN information indicating the second CN in the RRC Connection Request message or in the RRC Connection Setup Complete message. In one example, the UE may indicate the first CN selected by not including the CN information indicating the second CN in the RRC Connection Request message or in the RRC Connection Setup Complete message. The UE may indicate the second CN selected by not including the CN information indicating the first CN in the RRC Connection Request message or in the RRC Connection Setup Complete message.

Figure 4:
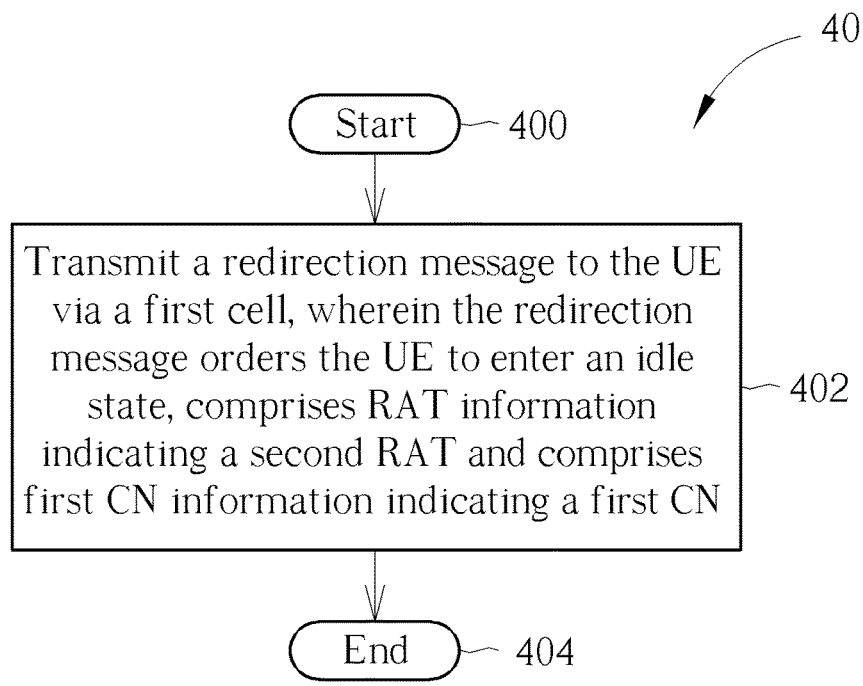
FIG. 4 is a flowchart of a process according to an example of the present invention.

A process 40 in FIG. 4 is utilized in a first BS of a first RAT (e.g., included in a network shown in FIG. 1) to handle a redirection for a UE, and includes the following steps:

Step 400: Start.

Step 402: Transmit a redirection message to the UE via a first cell, wherein the redirection message orders the UE to enter an idle state, comprises RAT information indicating a second RAT and comprises first CN information indicating a first CN.

Step 404: End.

After receiving the redirection message from the first cell of the first RAT, the UE selects a second cell of the second RAT according to the RAT information and generates a NAS message for the first CN according to the first CN information. Then, a second BS of the second RAT establishes a RRC connection via the second cell with the UE. The second BS receives the NAS message on the RRC connection via the second cell from the UE and transmits the NAS message to the first CN.

In one example, the first BS connects to the UE via the first cell, and receives an interface message from a CN node for the UE, before performing the step 402. The interface message indicates the first BS to redirect the UE to the second RAT and indicates the first CN. The first BS generates the redirection message to redirect the UE to the second RAT in response to (or according to) the interface message, wherein the redirection message orders the UE to enter the idle state, includes RAT information indicating the second RAT and includes the first CN information indicating the first CN. In details, the first BS determines to include the RAT information indicating the second RAT in the redirection message, when the interface message indicates the second RAT. The first BS determines to include the first CN information indicating the first CN in the redirection message, when the interface message indicates the first CN. Then, the first BS transmits the redirection message to the UE via the first cell.

In one example, the first BS determines to not include the first CN information indicating the first CN in the redirection message, when the interface message indicates a second CN. That is, the redirection message implicitly indicates the second CN by not including the first CN information. In one example, the first BS determines to include second CN information indicating the second CN in the redirection message instead of the first CN information, when the interface message indicates the second CN.

In one example, the interface message explicitly indicates the first CN, when the interface message includes CN information indicting the first CN. In one example, the interface message explicitly indicates the second CN, when the interface message includes CN information indicting the second CN. In one example, the interface message implicitly indicates the first CN, when the interface message does not include the CN information indicting the second CN. In one example, the interface message implicitly indicates the second CN, when the interface message does not include the CN information indicting the first CN.

In one example, the CN node includes the CN information indicating the first CN in the interface message, in response to a first message received by the CN node from the UE via the first BS. In one example, the first message is a Service Request message which does not indicate a fallback to a second CN or which indicates a fallback to the first CN. In one example, the first message is an Internet Protocol (IP) Multimedia Subsystem (IMS) signaling message (e.g., Session Initiation Protocol (SIP) message).

In one example, the CN node includes the CN information indicating the first CN in the interface message, when the CN node is congested. In one example, the CN node belongs to the second CN or a third CN.

In one example, the CN node includes the CN information indicating the second CN in the interface message, in response to a second message received by the CN node from the UE. In one example, the CN node indicates the second CN by not including the CN information indicating the first CN in the interface message, in response to the second message. In one example, the second message is a Service Request message which does not indicate a fallback to the first CN or which indicates a fallback to the second CN.

In one example, the CN node includes the CN information indicating the second CN in the interface message, when the CN node is congested. In one example, the CN node belongs to the first CN or the third CN.

The examples of the process 30 may be applied to the process 40, and are not narrated herein.

Figure 5:
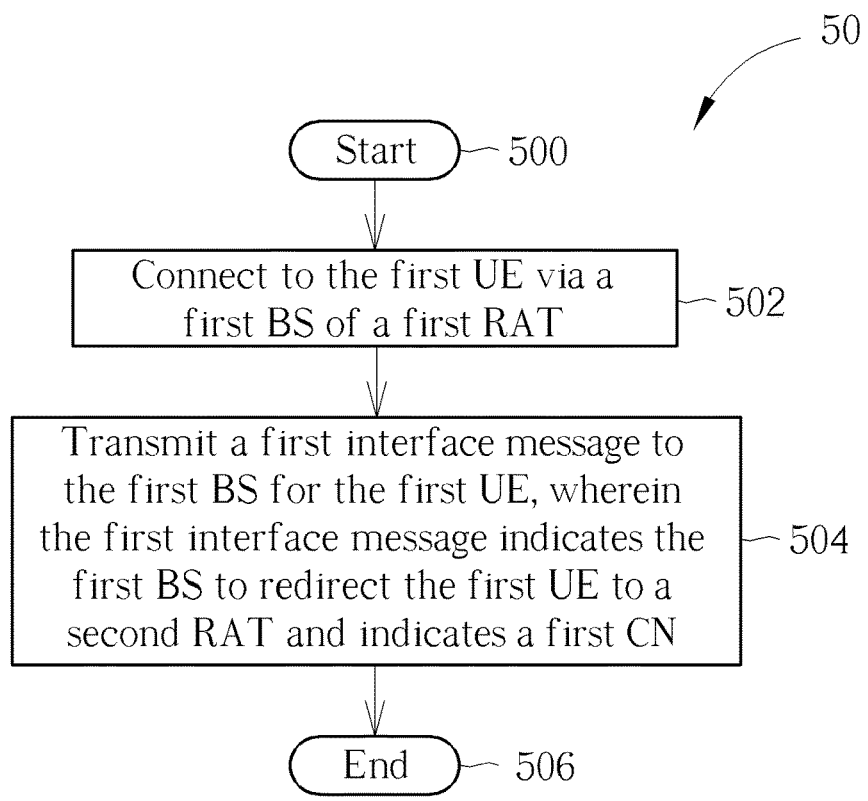
FIG. 5 is a flowchart of a process according to an example of the present invention.

A process 50 in FIG. 5 is utilized in a CN (e.g., included in a network shown in FIG. 1) to handle a redirection for a first UE, and includes the following steps:

Step 500: Start.

Step 502: Connect to the first UE via a first BS of a first RAT.

Step 504: Transmit a first interface message to the first BS for the first UE, wherein the first interface message indicates the first BS to redirect the first UE to a second RAT and indicates a first CN.

Step 506: End.

In one example, the first BS transmits a first redirection message to the first UE in response to the first interface message.

In one example, the CN node connects to a second UE via a BS (e.g., the first BS or a second BS), and transmits a second interface message to the BS for the second UE, wherein the second interface message indicates the BS to redirect the second UE to the second RAT and indicates a second CN. Then, the first BS transmits a second redirection message to the second UE in response to the second interface message.

Contents of the first redirection message and the second redirection message may be referred to the processes 30-40, and is not narrated herein.

In one example, the CN node includes CN information indicating the first CN in the first interface message, in response to a first message received by the CN node from the first UE via the first BS. In one example, the first message is a Service Request message which does not indicate a fallback to the second CN or which indicates a fallback to the first CN. In one example, the first message is an IMS signaling message (e.g. SIP message).

In one example, the CN node includes CN information indicating the first CN in the first interface message, when the CN node is congested. In one example, the CN node belongs to the second CN or a third CN.

In one example, the CN node includes CN information indicating the second CN in the second interface message, in response to a second message received by the CN node from the second UE. In one example, the CN node indicates the second CN by not including the CN information indicating the first CN in the second interface message, in response to the second message received by the CN node from the second UE. In one example, the second message is a Service Request message which does not indicate a fallback to the first CN or which indicates a fallback to the second CN.

In one example, the CN node includes the CN information indicating the second CN in the second interface message, when/if the CN node is congested. In one example, the CN node belongs to the first CN or the third CN.

Figure 6:
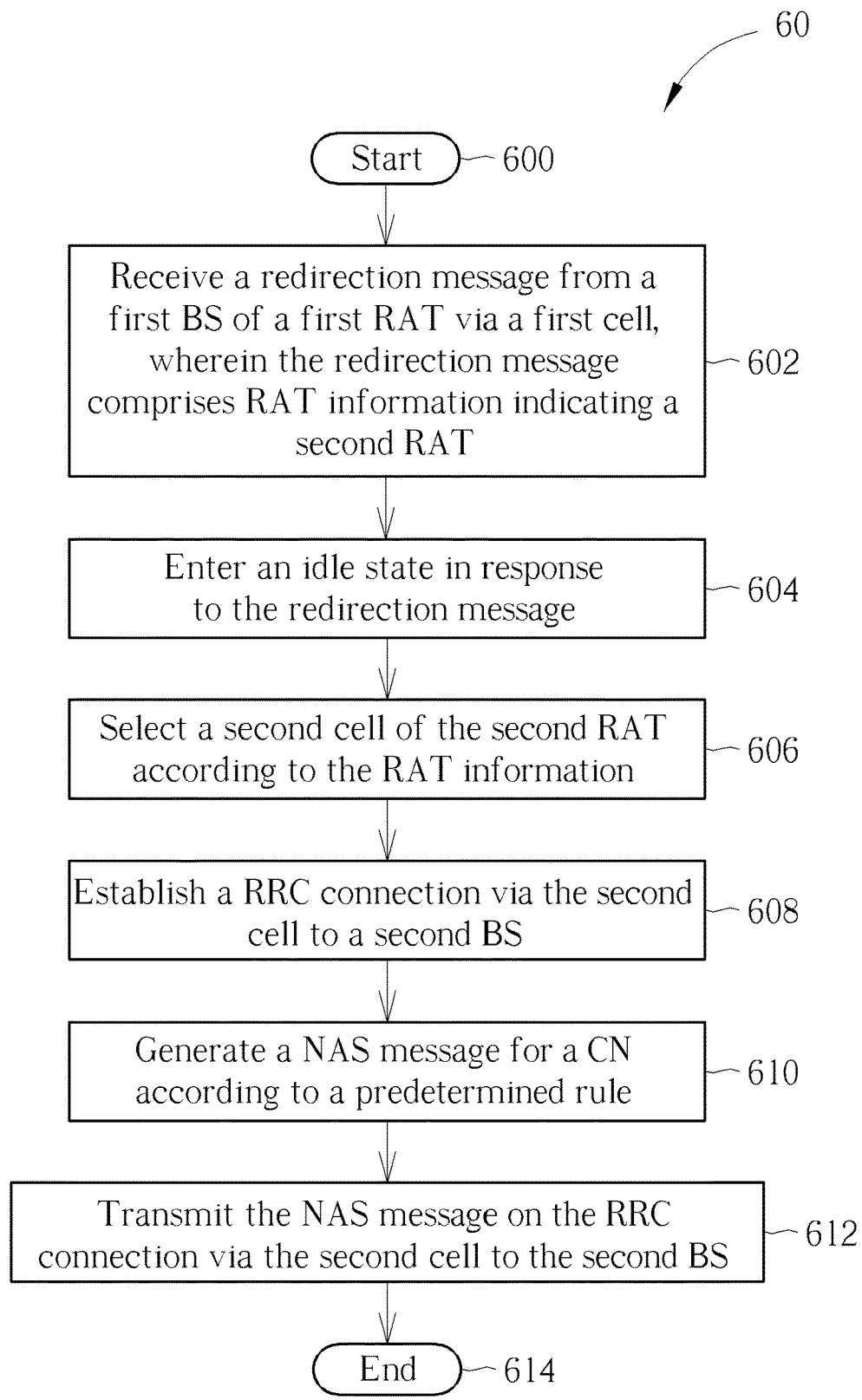
FIG. 6 is a flowchart of a process according to an example of the present invention.

A process 60 in FIG. 6 is utilized in a UE to handle a redirection, and includes the following steps:

Step 600: Start.

Step 602: Receive a redirection message from a first BS of a first RAT via a first cell, wherein the redirection message comprises RAT information indicating a second RAT.

Step 604: Enter an idle state in response to the redirection message.

Step 606: Select a second cell of the second RAT according to the RAT information.

Step 608: Establish a RRC connection via the second cell to a second BS.

Step 610: Generate a NAS message for a CN according to a predetermined rule.

Step 612: Transmit the NAS message on the RRC connection via the second cell to the second BS.

Step 614: End.

In one example, the redirection message may or may not indicate the CN. In one example, the redirection message may indicate another CN.

In one example, the UE selects the first CN or the second CN according to the predetermined rule. The second BS transmits the NAS message to the first CN. That is, the UE transmits the NAS message to the CN via the second BS. In one example, the UE applies the predetermined rule, when the second cell supports a plurality of CNs (e.g., the first CN and the second CN in the processes 30-50). In one example, the predetermined rule is that the UE keeps selecting a CN connected by the UE via the first BS. That is, the UE selects and connects to the same CN no matter the UE connects to the second BS via the second cell or connects to the first BS via the first cell.

In one example, the predetermined rule is that the UE keeps selecting a CN different from the CN connected by the UE via the first BS. That is, the UE selects and connects to a different CN, when the UE connects to the second BS via the second cell. For example, the UE connects to a first CN via the first BS, and selects and connects to a second CN via the second BS.

In one example, the UE in the idle state transmits a RRC Connection Request message via the second cell to the second BS, to establish the RRC connection. The UE receives a RRC Connection Setup message responding to the RRC Connection Request message from the second BS via the second cell, and considers that the RRC connection is established (i.e., the UE enters a connected state from the idle state). The UE transmits a RRC Connection Setup Complete message responding to the RRC Connection Setup message to the second BS via the second cell. In one example, the UE indicates that the first CN or the second CN is selected in the RRC Connection Request message or in the RRC Connection Setup Complete message.

The following examples may be applied to the processes 30-60.

In one example, the redirection message is a RRC message defined for the first RAT or a NAS message defined for the first RAT and the first CN. In one example, the RRC message is a RRC Release message or a RRC Connection Release message.

In one example, the first RAT is different from the second RAT. In one example, the first RAT is a New Radio (NR), and the second RAT is a E-UTRA. In one example, the first RAT is a RAT which is a next generation technology to the NR, and the second RAT is the NR. In one example, the first RAT and the second RAT are the same RAT. In one example, the first RAT is the E-UTRA, and the second RAT is the E-UTRA. In one example, the first RAT is the NR, and the second RAT is the NR.

In one example, the RAT information includes at least one of a RAT indication, carrier frequency information and area information, to indicate the RAT. For example, the RAT indication indicates the second RAT (e.g., E-UTRA or NR). The (first) UE selects a cell of the E-UTRA or the NR according to the RAT indication. For example, the carrier frequency information includes an absolute radio frequency channel number (ARFCN) indicating a carrier frequency of the RAT. The (first) UE selects a cell of the RAT on the carrier frequency according to the carrier frequency information. For example, the area information includes a RAN area identity identifying a RAN area or a (physical) cell identity identifying a cell of the RAT. The (first) UE selects the cell (of the RAT) identified by the (physical) cell identity or within the RAN area according to the area information.

In one example, the first BS and the second BS may connect to the same CN (e.g., the first CN or the second CN). In one example, the first BS and the second BS may connect to different CNs (e.g., the first CN and the second CN).

In one example, the first CN is different from the second CN. In one example, the first CN is a fifth generation core (5GC) network, and the second CN is an Evolved Packet Core (EPC) network. In one example, the first CN is a sixth generation core (6GC) network, and the second CN is the 5GC network. In one example, the first CN is the EPC network, and the second CN is the 5GC network. In one example, the first CN is the 5GC network, and the second CN is the 6GC network.

In one example, the redirection message indicates the first CN or the second CN.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a system redirection procedure. A UE may select a CN according to a redirection message, wherein contents of the redirection message are determined by a BS. Thus, the problem of handling the system redirection procedure can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a redirection, comprising:
    at least one storage device;
    at least one processing circuit, coupled to the at least one storage device; and
    at least one communication interfacing device, coupled to the at least one processing circuit, wherein the at least one storage device stores instructions, and the at least one processing circuit is configured to execute the instructions of:
    connecting to a fifth generation core (5GC) network through a first cell of a first base station (BS) of a New Radio (NR);
    transmitting an Internet Protocol (IP) Multimedia Subsystem (IMS) signaling message to the first BS;
    receiving a redirection message from the first BS of the NR via the first cell, wherein the redirection message comprises radio access technology (RAT) information indicating an Evolved Universal Terrestrial Radio Access (E-UTRA) and indicates the 5GC network or an Evolved Packet Core (EPC) network;
    entering an idle state in response to the redirection message;
    selecting a second cell of the E-UTRA according to the RAT information;
    establishing a radio resource control (RRC) connection via the second cell to a second BS, wherein the second BS is connected to the 5GC network and the EPC network;

generating a non-access-stratum (NAS) message for the 5GC network or the EPC network according to the redirection message; and transmitting the NAS message on the RRC connection via the second cell to the second BS.

2. The communication device of claim 1, wherein the redirection message comprises CN information indicating the 5GC network or the EPC network.

3. A first base station (BS) of a first radio access technology (RAT) for handling a redirection for a communication device, comprising:
at least one storage device;
at least one processing circuit, coupled to the at least one storage device; and
at least one communication interfacing device, coupled to the at least one processing circuit, wherein the at least one storage device stores instructions, and the at least one processing circuit is configured to execute the instructions of: receiving an Internet Protocol (IP) Multimedia Subsystem (IMS) signaling message from the communication device;
determining to comprise, in a redirection message, RAT information indicating a second RAT and first core network (CN) information indicating a first CN; and
transmitting the redirection message to the communication device via a first cell, wherein the redirection message orders the communication device to enter an idle state, comprises the RAT information indicating the second RAT and comprises the first CN information indicating the first CN;
wherein the communication device selects a second cell of the second RAT according to the RAT information and generates a non-access-stratum (NAS) message for the first CN according to the first CN information, after receiving the redirection message from the first cell of the first RAT;
wherein a second BS of the second RAT establishes a RRC connection via the second cell with the communication device and receives the NAS message on the RRC connection via the second cell from the communication device;
wherein the first RAT is a New Radio (NR) and the second RAT is an Evolved Universal Terrestrial Radio Access (E-UTRA);
wherein the first CN is a fifth generation core (5GC) network or an Evolved Packet Core (EPC) network.

4. A core network (CN) node for handling a redirection for a first communication device, comprising:
at least one storage device;
at least one processing circuit, coupled to the at least one storage device; and
at least one communication interfacing device, coupled to the at least one processing circuit, wherein the at least one storage device stores instructions, and the at least one processing circuit is configured to execute the instructions of:
connecting to the first communication device via a first BS of a first radio access technology (RAT);
receiving an Internet Protocol (IP) Multimedia Subsystem (IMS) signaling message from the communication device; and
transmitting a first interface message to the first BS for the first communication device in response to the IMS signaling message, wherein the first interface message indicates the first BS to redirect the first communication device to a second RAT and indicates a first CN;
wherein the communication device selects a second cell of the second RAT, establishes a radio resource control (RRC) connection via the second cell to a second BS, and generates a non-access-stratum (NAS) message for the first CN; wherein the second BS of the second RAT receives the NAS message on the RRC connection via the second cell from the communication device;
wherein the first RAT is a New Radio (NR) and the second RAT is an Evolved Universal Terrestrial Radio Access (E-UTRA);
wherein the first CN is a fifth generation core (5GC) network or an Evolved Packet Core (EPC) network.

5. The CN node of claim 4, wherein the instructions further comprise:
connecting to a second communication device via a second BS; and
transmitting a second interface message to the second BS for the second communication device, wherein the second interface message indicates the second BS to redirect the second communication device to the second RAT and indicates a second CN.

6. The CN node of claim 4, wherein the instructions further comprise:
comprising CN information indicating the first CN in the first interface message, when the CN node is congested.

7. The communication device of claim 1, wherein the instructions further comprise:
indicating that the 5GC network or the EPC network is selected in a RRC Connection Request message or in a RRC Connection Setup Complete message.

8. The CN node of claim 4, wherein the IMS signaling message is a Session Initiation Protocol (SIP) message.

* * * * *